(No Model.)
H. L. WEBBER.
TREE PROTECTOR.
No. 404,757. Patented June 4, 1889.
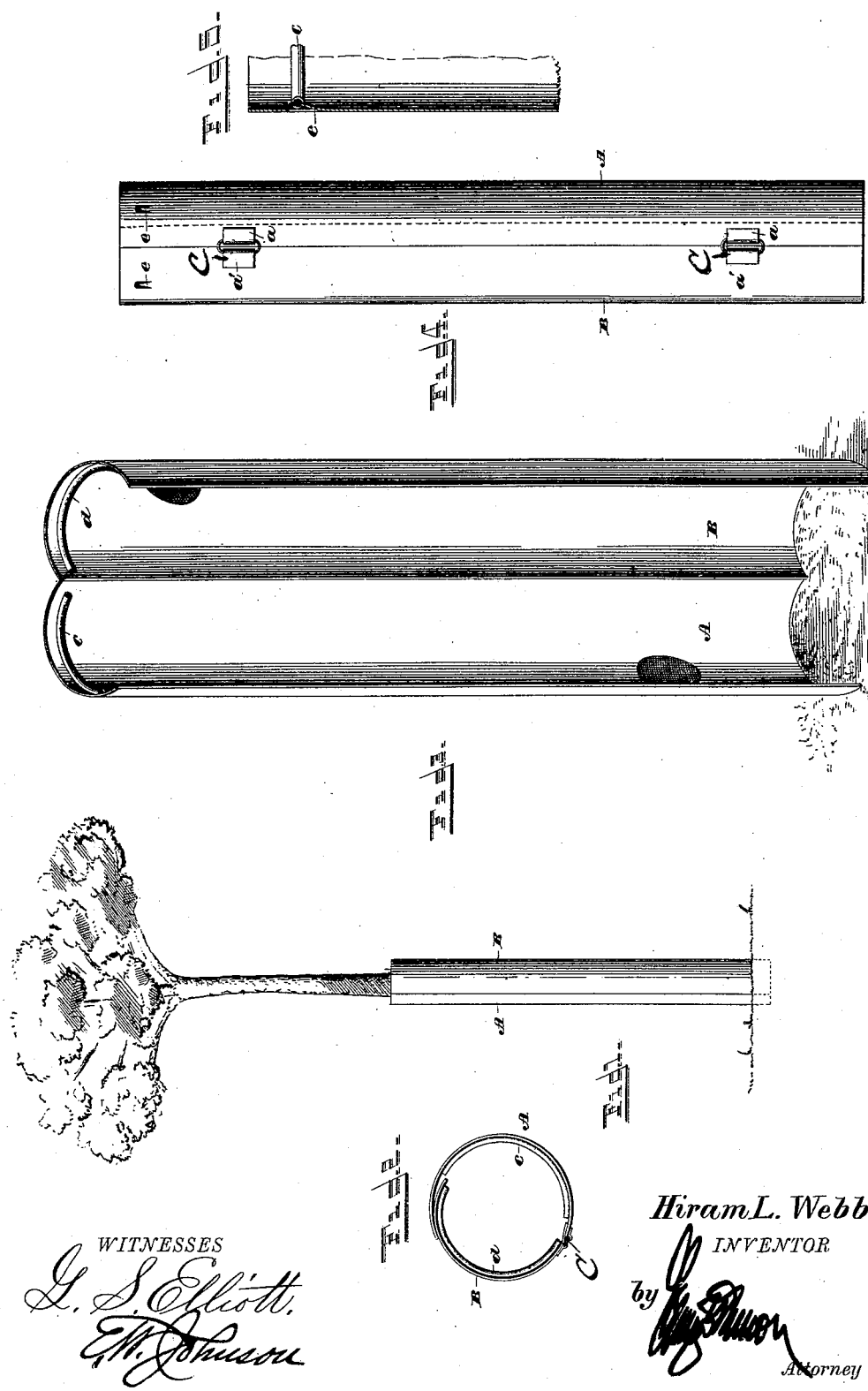
WITNESSES
L. S. Elliott,
E. W. Johnson
Hiram L. Webber
INVENTOR
by _____ Attorney

UNITED STATES PATENT OFFICE.

HIRAM L. WEBBER, OF STAFFORD, KANSAS.

TREE-PROTECTOR.

SPECIFICATION forming part of Letters Patent No. 404,757, dated June 4, 1889.

Application filed November 1, 1888. Serial No. 289,766. (No model.)

*To all whom it may concern:*

Be it known that I, HIRAM L. WEBBER, a citizen of the United States of America, residing at Stafford, in the county of Stafford and State of Kansas, have invented certain new and useful Improvements in Tree-Protectors; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in tree-protectors, the object of my invention being to provide a cheap, simple, and effective protector for the trunks of trees or the stems of plants which can be readily applied and detached therefrom; and it consists in a tree or plant protector made up of two longitudinal sections of sheet metal, which are curved or bent from different centers, said sections being hinged to each other by connections located at the edge of one of the sections and at a slight distance from the edge of the opposite section, so as to form a tight joint when closed, the free edges of the sections being adapted to overlap each other and be maintained in position by the pressure of the sections one upon the other.

My invention also consists in providing the plant or tree protector near the upper edge with rubber tubes, which are secured thereto by prongs struck up from the metallic sections, as will be hereinafter fully set forth.

My invention further consists in the construction and combination of the parts, as will be hereinafter fully set forth and specifically claimed.

Referring to the accompanying drawings, Figure 1 is a side view of my improved tree or plant protector, showing the same applied. Fig. 2 is a plan view. Fig. 3 is a side view showing the sections open. Fig. 4 is a side or rear view. Fig. 5 is a detail view showing the manner in which the rubber tube is secured to the sections.

A refers to one of the sections, and B to the other. The section A, at or very near the edge, has attached thereto the leaves $a\ a$ of the hinges C, the opposite leaves $a'\ a'$ being secured at a slight distance from the edge of the section B to provide a lap-joint, as shown in Fig. 2 and in dotted lines in Fig. 4. The leaves $a\ a'$ of the hinges are connected by a bail or looped pintle, so as to permit the sections to separate slightly at their edges where the hinges are attached when swung apart.

The sections A and B are preferably made of galvanized or non-corrodible metal, and they are each curved or bent longitudinally in the segment of different circles, either throughout their entire lengths or near their edges, so that when the sections are folded upon each other the edge of one section will abut against the adjacent section with sufficient pressure or force to form a tight joint and hold the sections where placed, and also permitting the sections to expand as the tree or plant grows.

The upper edge of my improved tree or plant protector has secured thereto pieces of rubber tubes $c\ d$, which should bear upon the surface of the tree or plant so as to exclude insects, and these rubber tubes are held in place by means of prongs $e$, which are struck up or out of the sections A B. Said prongs being pointed and extending inward, the rubber tubes are readily secured thereto, said prongs being first pressed into and through the tubes and then bent to lie within the openings from which the metal has been removed to form the prongs. By means of this construction the rubber tubes, when they become decayed after a season's use, can be readily removed and new ones secured in place.

For the purpose of providing ventilation to the protected portion of the tree or plant the sections A and B are provided with one or more openings, over which are secured screens of fine wire netting or gauze, which will allow a circulation of air and prevent the ingress of insects.

The tree or plant protectors are light and can be easily handled, and when applied have sufficient rigidity to permit their being forced into the ground around the base of the tree or plant, and when it is desired to store or ship them they can be partially opened and placed one within the other, and when so placed the free inwardly-turned edges will assist in holding them together, and when so stacked they will occupy but little room.

For small plants the sections may be made of light tin or even water-proofed paper.

Having thus described my invention, I claim—

1. In a tree or plant protector, the combination of two metallic sections curved or bent from different centers, so that when the sections are placed edge to edge they will overlap and form tight joints, and hinges for connecting said sections, one series of the leaves thereof being located at the edge of one of the sections and the opposite leaves of the hinges being placed at a distance from the adjacent edge of the opposite section, substantially as shown, and for the purpose set forth.

2. As an improved article of manufacture, a tree or plant protector made up of two longitudinal sheet-metal sections bent to form curved sections, one of said sections being of a greater curve than the other section, the sections being hinged to each other, the leaves of said hinges being secured to the outer edge of the larger curved section, the opposite leaves being secured at a distance from the edge of the smaller section, substantially as shown, whereby the sections may be opened to a greater distance than the diameter of the sections, and when closed will form tight joints between the edges and will be retained in a closed position by the pressure of the free edges of the sections upon each other.

3. In a tree or plant protector, the combination of the sheet-metal sections A B, having struck-up metal prongs formed integral therewith for holding in place flexible tubes or packing, substantially as set forth.

4. In combination with a tree or plant protector having the body portion made up of sheet metal, flexible rubber tubes attached near the inner upper edges thereof and held removably in place by metal prongs formed integral with the body portion, substantially as shown, and for the purpose set forth.

In testimony whereof I affix my signature in presence of two witnesses.

HIRAM L. WEBBER.

Witnesses:
G. W. FORT,
S. E. PEACOCK.